United States Patent
Majewski et al.

(10) Patent No.: US 9,740,526 B2
(45) Date of Patent: Aug. 22, 2017

(54) JOB SCHEDULING METHOD

(71) Applicant: International Business Machines Corporation, Armonk, NY (US)

(72) Inventors: Piotr Majewski, Warsaw (PL); Grzegorz Puchawski, Warsaw (PL); Mariusz Rokicki, Warsaw (PL); Jaroslaw P. Sobieszek, Warsaw (PL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 538 days.

(21) Appl. No.: 14/054,151

(22) Filed: Oct. 15, 2013

(65) Prior Publication Data
US 2014/0109104 A1    Apr. 17, 2014

(30) Foreign Application Priority Data

Oct. 16, 2012    (GB) .................................. 1218494.1

(51) Int. Cl.
G06F 9/46    (2006.01)
G06F 9/50    (2006.01)
G06F 9/48    (2006.01)

(52) U.S. Cl.
CPC .............. *G06F 9/50* (2013.01); *G06F 9/4881* (2013.01); *G06F 9/5066* (2013.01); *G06F 2209/485* (2013.01); *G06F 2209/504* (2013.01); *Y02B 60/142* (2013.01)

(58) Field of Classification Search
None
See application file for complete search history.

(56) References Cited

U.S. PATENT DOCUMENTS

| | | | |
|---|---|---|---|
| 8,082,546 | B2 | 12/2011 | Coppinger et al. |
| 2007/0022426 | A1 | 1/2007 | Steinder et al. |
| 2007/0124733 | A1 | 5/2007 | Bril et al. |
| 2009/0031312 | A1 | 1/2009 | Mausolf et al. |
| 2011/0022706 | A1 | 1/2011 | Borghetti et al. |

OTHER PUBLICATIONS

Efficient Resource Scheduling in Data Centers using MRIS, Nagendram et al., Oct. 2011.*
International Search Report for Appl. No. GB1218494.1 dated Mar. 7, 2013, 1 page.
Ying Meng et al. "A tabu search heuristic to solve the scheduling problem for a batch processing machine with non-identical job sizes" Logistics Systems and Intelligent Management, 2010 International Conference, vol. 3, pp. 1703-1707.

* cited by examiner

*Primary Examiner* — Bing Zhao
(74) *Attorney, Agent, or Firm* — Cantor Colburn LLP (57) ABSTRACT

A method for scheduling a single subset of jobs of a set of jobs satisfying a range constraint of number of jobs, wherein the jobs of the set of jobs share resources in a computing system, each job being assigned a weight, w, indicative of the memory usage of the job in case of its execution in the computer system, the method including: for each number of jobs, x, satisfying the range constraint, determining from the set of jobs a first subset of jobs using a knapsack problem, wherein the knapsack problem is adapted to select by using the weights the first subset of jobs having the number of jobs and having a maximal total memory usage below the current available memory of the computer system, and selecting the single subset from the first subset.

15 Claims, 3 Drawing Sheets

JOB SCHEDULING METHOD

PRIORITY

This application claims priority to Great Britain Application No. 1218494.1 filed Oct. 16, 2012, and all the benefits accruing therefrom under 35 U.S.C. §119, the contents of which in its entirety are herein by reference.

BACKGROUND

The invention relates to the field of data processing, and more particularly to a method for scheduling jobs in a computer system. Having a significant impact on computing system performance, job scheduling becomes an important subject of developments in data processing fields that aim to improving computing system performance.

SUMMARY

The invention may be embodied in a computer implemented method for scheduling a single subset of jobs of a set of jobs satisfying a range constraint of number of jobs, in which the jobs of the set of jobs share resources in a computing system, each job being assigned a weight, w, indicative of the memory usage of the job in case of its execution in the computer system. The method includes for each number of jobs, x, satisfying the range constraint, determining from the set of jobs a first subset of jobs using a knapsack problem, in which the knapsack problem is adapted to select by using the weights the first subset of jobs having the number of jobs and having a maximal total memory usage below the current available memory of the computer system; selecting the single subset from the first subset of jobs.

BRIEF DESCRIPTION OF THE SEVERAL VIEWS OF THE DRAWINGS

In the following, illustrative embodiments of the invention will be described in greater detail by way of example only making reference to the drawings in which.

DETAILED DESCRIPTION

Embodiments of the invention provide for an improved computer-implemented method for scheduling jobs in a computing environment, a computer system and a computer program product. This is solved by the subject matter of the independent claims.

The term 'job' as used herein generally refers to a portion of a processing task that is executed by a data processing system.

The term "memory usage" of a job as used herein generally refers to the amount of memory consumed by the job when it is processed.

In one aspect, an embodiment relates to a computer implemented method for scheduling a single subset of jobs of a set of jobs satisfying a range constraint of number of jobs, in which the jobs of the set of jobs share resources in a computing system, each job being assigned a weight, w, indicative of the memory usage of the job in case of its execution in the computer system.

The set of jobs may be a received set of jobs from a user of the computing system. Alternatively, the set of jobs may be automatically generated by the computing system. The set of jobs may be in a queue waiting for execution. The term "queue" as used herein generally refers to a collection of schedulable jobs (or job-related tasks) within the queuing system of the computer system.

The range constraint may restrict the number of jobs of the single subset to be in a range of number of jobs. The resources include a memory, and renewable resources such as CPU and hard disk.

The method includes: a) for each number of jobs, x, satisfying the range constraint, determining from the set of jobs a first subset of jobs using a knapsack problem, in which the knapsack problem is adapted to select by using the weights the first subset of jobs having the number of jobs and having a maximal total memory usage below the current available memory of the computer system.

The knapsack problem may be formulated such that it selects a number of jobs equal to a predetermined number of jobs which maximize the total memory usage. The total memory usage may be the sum of the memory usages of each job of the subset.

The method further includes selecting the single subset from the first subset of jobs.

These features may maximize memory utilization and minimize the completion time of all the jobs while maintaining the number of scheduled jobs within an optimal range. Also, this may overcome the limited memory constraint and thus achieve a maximal throughput.

According to one embodiment, the determining includes: for each number of jobs, x, satisfying the range constraint, solving the knapsack problem using a method selected from the group consisting of mathematical programming, dynamic programming, and greedy algorithms.

This embodiment may solve the knapsack problem as defined in the present disclosure by solving with various techniques. This may facilitate the integration of the present method into existing systems.

According to another embodiment, the selecting of the single subset includes providing a first memory threshold value and a second memory threshold value; selecting from the first subset a second set of subsets, in which each subset of the second set has the total memory usage higher than the first memory threshold value and lower than the second memory threshold value; selecting the single subset from the second set of subsets as the subset of jobs satisfying an operating condition of the computer system.

According to another embodiment, the providing includes: determining the total memory usage of each subset of the first subset, and selecting the maximal total memory usage, in which the first threshold value and the second threshold value are determined using the maximal total memory usage. For example, the first threshold value may be equal to 95% of the maximal total memory usage, and the second threshold value may be equal to 100% of the maximal total memory usage.

This maximize the memory utilization, another performance constraint may be fulfilled which may improve the overall performance of the system.

According to another embodiment, the first memory threshold and the second memory threshold are determined based on the running jobs. Continuing on the example above, the first threshold value may be equal to 95% of the maximal total memory usage minus the memory usage of the running jobs, and the second threshold value may be equal to 100% of the maximal total memory usage minus the memory usage of the running jobs.

According to another embodiment, each job is associated with a user ID, in which the operating condition includes: a maximum number of jobs having a same user ID.

This may accelerate the execution of individual user jobs and thus increase user's satisfaction. For example, a single user may send 6 jobs. The 6 jobs may belong to a subset that is determined in procedure a) as a solution to the present knapsack problem. That is, from all the subsets that have 6 jobs this subset of the user has the maximal memory usage. In procedure a) other subsets may be determined for different numbers than 6 which satisfy the range constraint e.g. subsets having 7 and 5 jobs in case the range is an interval between 5 and 7, which results in 3 different subsets having each a maximal total memory usage. In case the 6 jobs may require a memory usage of 96% of the maximal total memory usage, in which the maximal total usage is achieved by one of the two other subsets which have jobs which belong to different users, the single user jobs may be selected to be scheduled since they use a significant amount of memory and in addition they may quickly satisfy the single user request.

According to another embodiment, the method further includes partitioning the jobs of each subset of the second set into job categories; in which the operating condition includes: a maximum number of jobs belonging to a same job category.

A job category may differentiate, for example, a batch process, and/or an on-line process. Giving scheduling priority to jobs belonging to the same category while maximizing the memory usage may further increase the system performance, since jobs of the same category may be easily coordinated.

According to another embodiment, the solving using dynamic programming includes: recursively determining a solution T[i, w, x] to the adapted knapsack problem for a value of x, in which:

$$T[i, W, x] = \max(T[i-1, W, x], T[i-1, W-w\_i, x-1] + w\_i),$$

where W is the current available memory of the computer system, i is the first i jobs of the set of jobs and w_i is the weight of ith job.

According to another embodiment, selecting the single subset includes comparing the solution T[i, W, x] for each number of jobs x; determining the single subset as a subset having a solution T[i,W,x] defining a number of jobs x with the maximal total usage of memory. This may further maximize the memory utilization in the system.

According to another embodiment, the method further includes providing a predefined lower limit k and a predefined upper limit l of jobs, comparing the lower limit k with the number of running jobs r in the computer system, and determining the range constraint as the interval [k−r, l−r], in case r is below k.

The comparison of the lower limit and the running jobs may be regularly performed until the number of running jobs becomes smaller than the predefined limit k.

According to another embodiment, the range constraint is determined as the interval [k−r, j], in case r is below k, in which:

$j = l - r$ if $l - r > h$, $j = h$ if $l - r < h$, where h is the number of jobs in the set of jobs.

This may reduce the execution time needed for selecting the subset of jobs to be scheduled that would otherwise be required when estimating the solutions for the interval [h, l−r].

According to another embodiment, the method further includes providing a predefined lower limit k and a predefined upper limit l of jobs based on the running jobs, and determining the range constraint as the interval [k, l]. For example, the system may receive from a user the range of jobs he/she wanted to have which takes into account the running jobs, that is, the user may first subtract the number of running jobs from his/her wished numbers before providing the interval limits to the system.

According to another embodiment, the computing system includes a database system, in which each job is a SQL query job.

In another aspect, an embodiment relates to a computer-readable medium, including computer-readable program code embodied therewith which, when executed by a processor, cause the processor to execute a method according to anyone of the previous claims.

In another aspect, an embodiment relates to a computer system for scheduling a single subset of jobs of a set jobs satisfying a range constraint of number of jobs, in which the jobs of the set of jobs share resources in the computer system, each job being assigned a weight, w, indicative of the memory usage of the job in case of its execution in the computer system, the computer system including a determining unit operable to determine, for each number of jobs, x, satisfying the range constraint, from the set of jobs a first subset of jobs using a knapsack problem, in which the knapsack problem is adapted to select by using the weights the first subset of jobs having the number of jobs and having a maximal total memory usage below the current available memory of the computer system, and a selecting unit being operable to select from the first subsets obtained by the determining unit the single subset.

A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example a data may be retrieved over a modem, over the internet, or over a local area network. Computer executable code embodied on a computer readable medium may be transmitted using any appropriate medium, including but not limited to wireless, wireline, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

'Computer memory' or 'memory' is an example of a computer-readable storage medium. Computer memory is any memory which is directly accessible to a processor. 'Computer storage' or 'storage' is a further example of a computer-readable storage medium. Computer storage is any non-volatile computer-readable storage medium. In some embodiments computer storage may also be computer memory or vice versa.

A 'processor' as used herein encompasses an electronic component which is able to execute a program or machine executable instruction or computer executable code. References to the computing device including "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each including a processor or processors. The computer executable code may be executed by multiple processors that may be within the same computing device or which may even be distributed across multiple computing devices.

Computer executable code may include machine executable instructions or a program which causes a processor to perform aspects of embodiments of the present invention. Computer executable code for carrying out operations for aspects of the embodiments may be written in any combination of one or more programming languages, including an object oriented programming language such as Java, Smalltalk, C++ or the like and conventional procedural programming languages, such as the "C" programming language or similar programming languages and compiled into machine executable instructions. In some instances the computer executable code may be in the form of a high level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments are described with reference to flowchart illustrations and/or block diagrams of methods, apparatus (systems) and computer program. It will be understood that each block or a portion of the blocks of the flowchart, illustrations, and/or block diagrams, can be implemented by computer program instructions in form of computer executable code when applicable. It is further under stood that, when not mutually exclusive, combinations of blocks in different flowcharts, illustrations, and/or block diagrams may be combined. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational procedures to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be appreciated by one skilled in the art, aspects of the embodiments may be realized as an apparatus, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present embodiments may take the form of a computer program product embodied in one or more computer readable medium(s) having computer executable code embodied thereon.

It is understood that one or more of the aforementioned embodiments may be combined as long as the combined embodiments are not mutually exclusive.

Turning now to the drawings, like numbered elements in the figures either designate similar elements or designate elements that perform equivalent functions. Elements which have been discussed previously will not necessarily be discussed in later figures if the function is equivalent.

Figure 1:
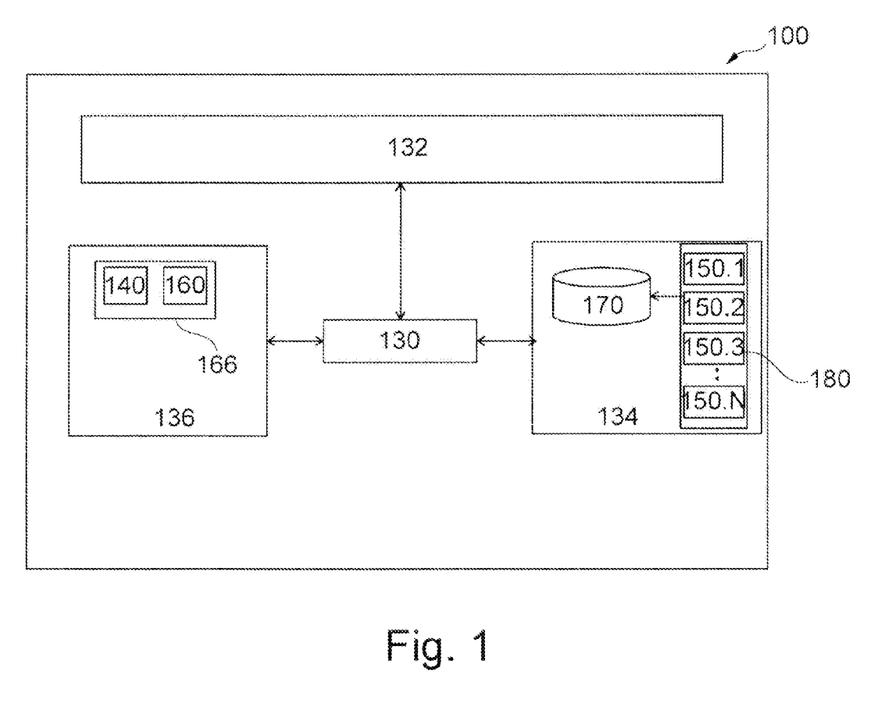
FIG. 1 illustrates system architecture for the execution of a method for scheduling jobs.

FIG. 1 depicts proposed system architecture 100 operable to execute a process for scheduling a single subset of jobs of a set of jobs 150 satisfying a range constraint of number of jobs and using the maximal total memory usage. The selection is performed by solving a knapsack problem that is adapted to provide solutions that maximize memory usage for a predefined number of jobs.

The system 100 includes a processor 130. The processor 130 is connected to a user interface 132, computer storage 134, and computer memory 136.

The computer storage 134 is shown as containing the set of jobs 150. The jobs of the set of jobs 150 share resources such as the computer memory 136 of the system 100. The set of jobs 150 may be automatically generated by the computer system or may be received from a user of the computer system 100 via the user interface 132. The user interface 132 displayed to the user may include graphical user interface elements (GUI elements).

The computer storage 134 is further shown as containing a database 170 that may be queried by jobs being SQL query jobs.

The computer storage 134 is further shown as containing a queuing system 180 containing the set of jobs 150. The set of jobs 150 may be in a queue waiting for execution.

The computer memory 136 is shown as containing a scheduler 166 which contains a determining unit 140 and a selecting unit 160. The determining 140 and selecting units 160 contain computer-executable codes which enable the processor to control the computer system to schedule a single subset of jobs of the set jobs 150 satisfying a range constraint. The computer-executable codes are loaded into the computer memory 136 before execution by the processor 130.

The operation of the system 100 will be described in more detail with reference to FIG. 2.

Figure 2:
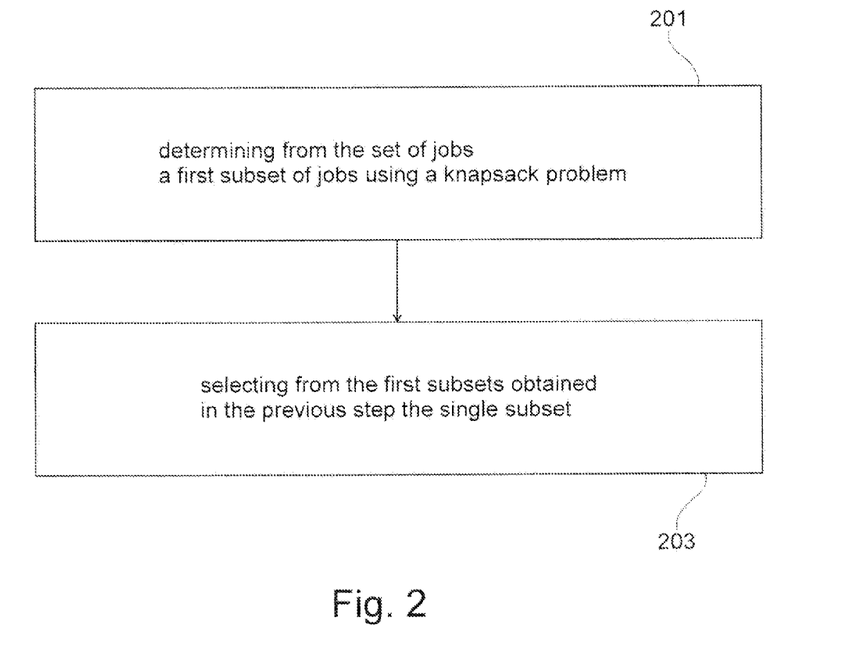
FIG. 2 is a flowchart of a method for scheduling the jobs.
Figure 3:
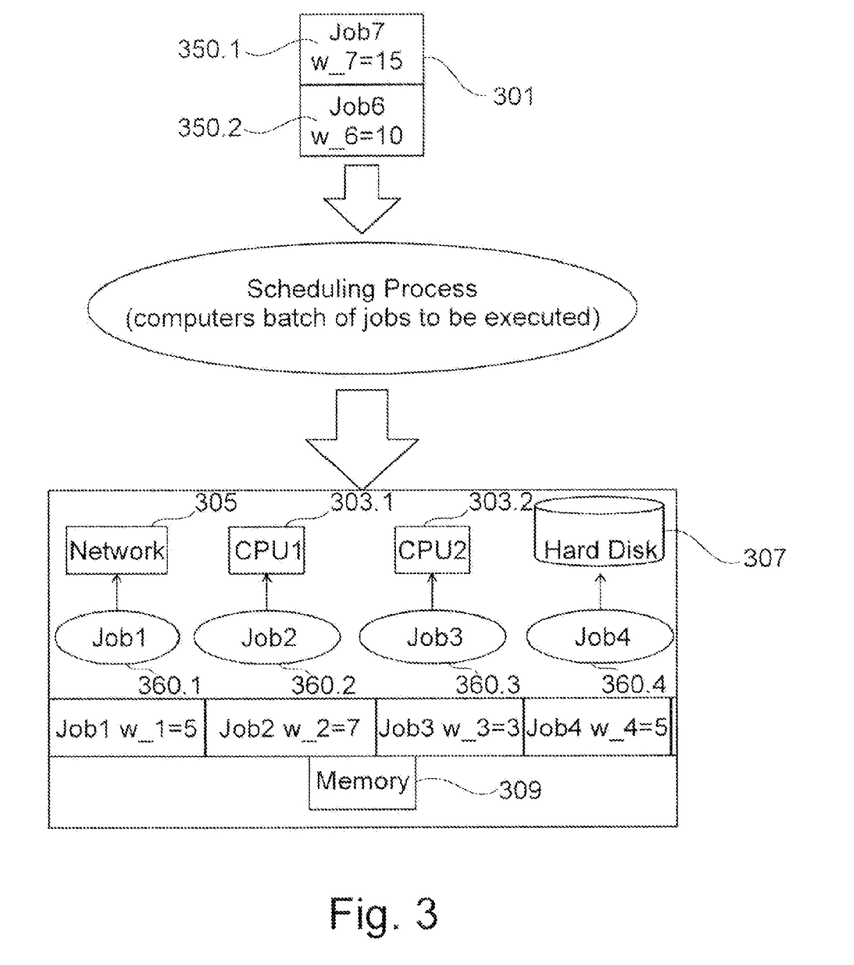
FIG. 3 is a schematic view of the jobs scheduling environment.

FIG. 2 is a flowchart of a method for scheduling a single subset of jobs of the set jobs satisfying a range constraint of number of jobs. The jobs of the set of jobs 150 share resources in the computing system 100. Each job being assigned a weight, w, indicative of the memory usage of the job in case of its execution in the computer system. The set of jobs may be in a queue (e.g. 301 of FIG. 3) waiting to be scheduled for execution. The set of jobs may share resources such as CPU 303, network 305 disk space 307 and memory 309 when they are running on the computing system, as shown in FIG. 3 where the already running jobs 360 are sharing the resources.

In procedure 201, the determining unit 140 determines, for each number of jobs, x, satisfying the range constraint, from the set of jobs a first subset of jobs using a knapsack problem. The knapsack problem is adapted to select, by using the weights, the first subset of jobs having the number of jobs and having a maximal total memory usage below the current available memory of the computer system.

This is done by solving for each number of jobs, x, the knapsack problem using a method or algorithm such as the mathematical programming, dynamic programming, and/or greedy algorithms.

In case of using the dynamic programming to solve the adapted knapsack problem for a given number of jobs x, the determining unit 140 recursively determines a solution T[i, w, x] to the adapted knapsack problem for a value of x, using the equation $$T[i, W, x] = \max(T[i-1, W, x], T[i-1, W-w\_i, x-1] + w\_i),$$

where W is the current available memory of the computer system 100, i is the first i jobs of the set of jobs 150 and w_i is the weight w of ith job.

The solution T[i,W,x] is a subset of exactly x jobs {b_j_1, ..., b_j_x} that maximize the sum of their respective weights T=w_j_1+ ... +w_j_x, while T is not exceeding the current available memory W. The index j refers to the combination of x jobs that has been selected from the i jobs.

In procedure 203, the selecting unit 160 selects from the first subset obtained by the determining unit the single subset.

The selecting of the single subset includes: providing a first memory threshold value and a second memory threshold value; selecting from the first subset a second set of subsets, in which each subset of the second set of subsets has the total memory usage higher than the first memory threshold value and lower than the second memory threshold value; selecting the single subset from the second set of subsets as the subset of jobs satisfying an operating condition of the computer system.

For example, each job is being assigned a user ID, and the operating condition includes a maximum of jobs having a same user ID.

In another example, the determining unit partitions the jobs of each subset of the second set into job categories. For example, each job is being assigned a category ID. The category ID is indicative of the category to which belongs the job. For example, the category may relate to a batch process, and/or an on-line process. In this case, the operating condition includes: a maximum number of jobs belonging to a same category.

In another example, to select the single subset the selecting unit 160 compares the solutions T[i, W, x] for each number of jobs x; and then determines the single subset as a subset having a solution T[i,W,x] defining a number of jobs x with the maximal total usage of memory.

The range constraint of the number of jobs may be determined in various ways. For example, a predefined lower limit k and a predefined upper limit l of jobs may be provided. The determining unit 140 compares the lower limit k with the number of running jobs r in the computer system. This is regularly performed, for example in a "WHILE" loop checking in case r is below k the range constraint is determined as the interval [k–r, l–r].

Illustrative examples are shown below. In the interest of clarity, not all details of the implementation are described.

For example, assuming the lower limit k=10, the upper limit l=20 and the system memory=100 blocks. Assuming that the number of currently running jobs becomes r=9 and the running jobs consume 96 blocks out of 100, the available memory is of 4 blocks and the range constraint is defined by the interval [1, 11] (i.e. [l–r, k–r]).

An initial set of jobs includes 4 jobs {j_1, j_2, j_3, j_4} in the queue, having respectively an expected memory usage of w_1=1 block, w_2=5 blocks, w_3=4 blocks, w_4=2 blocks.

The T[i, W, x] is first computed for each value x from 1 to 4 that maximizes the memory usage of the x jobs. W is the current available memory, i is the first i jobs of the initial set of jobs, where i =0, ..., 4.

The scheduler may know which jobs maximize memory utilization for each entry in T by adding for example an entry in a matrix T'[i, W, x] which is defined to contain subsets of jobs that maximize memory utilization for given i, W and x. However, this is optional and other ways of implementing or using this feature may be chosen.

$$T'[i, w, x] = T'[i-1, w, x],$$
$$\text{if } T[i-1, w, x] >= T[i-1, w-w\_i, x-1] + w\_i$$

$$T'[i, w, x] =$$
$$T'[i-1, w-w\_i, x-1] + \{j\_i\} \text{ if } T[i-1, w-w\_i, x-1] + w\_i >$$
$$T[i-1, w, x]$$

(i.e. a new job j_i is added to the set $T'[i-1, w-w\_i, x-1]$)

$$T[0, w, x] = 0 \text{ for } w = 0 \ldots 4, x = 0.$$

$$T[0, w, x] = -inf \text{ for } w = 0 \ldots 4, x = 1 \ldots 4.$$

–inf means that for x=1 ... 4 there is no subset of x jobs (i.e. deriving x jobs from 0 jobs) that may solve the knapsack problem. For x=0, 0 jobs are selected to maximize memory utilization.

$T[i, 0, x] = 0$ for $i = 0 \ldots 4$, $x = 0$.

$T[i, 0, x] = -inf$ for for $i = 0 \ldots 4$, $x = 1, \ldots 4$.

−inf means that for x=1 . . . 4 there is no subset of x jobs (deriving x jobs for no available memory) that may solve the knapsack problem. For x=0, 0 jobs are selected.

$T[i, w, 0] = 0$ for $i = 0 \ldots 4$, $w = 0 \ldots 4$.

This means that empty set solve the knapsack problem. This is due to the fact that the number of requested jobs is 0.
Negative index in T matrix always implies −inf.

…

$x = 1$, $w = 1$, $i = 1, \ldots, 4$:

$T[1, 1, 1] = \max(T[0, 1, 1], T[0, 1 - 1, 0] + 1) = 1$;

$T'[1, 1, 1] = \{j\_1\}$ $T[2, 1, 1] = \max(T[1, 1, 1], T[1, 1 - 5, 0] + 5) = 1$;

$T'[2, 1, 1] = \{j\_1\}$ $T[3, 1, 1] = \max(T[2, 1, 1], T[2, 1 - 4, 0] + 4) = 1$;

$T'[3, 1, 1] = \{j\_1\}$ $T[4, 1, 1] = \max(T[3, 1, 1], T[3, 1 - 2, 0] + 2) = 1$;

$T'[4, 1, 1] = \{j\_1\}$ $x = 1$, $w = 2$, $i = 1, \ldots, 4$:

$T[1, 2, 1] = \max(T[0, 2, 1], T[0, 2 - 1, 0] + 1) = 1$;

$T'[1, 2, 1] = \{j\_1\}$ $T[2, 2, 1] = \max(T[1, 2, 1], T[1, 2 - 5, 0] + 5) = 1$;

$T'[2, 2, 1] = \{j\_1\}$ $T[3, 2, 1] = \max(T[2, 2, 1], T[2, 2 - 4, 0] + 4) = 1$;

$T'[3, 2, 1] = \{j\_1\}$ $T[4, 2, 1] = \max(T[3, 2, 1], T[3, 2 - 2, 0] + 2) = 2$;

$T'[4, 2, 1] = \{j\_4\}$ $x = 1$, $w = 3$ $i = 1, \ldots, 4$:

$T[1, 3, 1] = \max(T[0, 3, 1], T[0, 3 - 1, 0] + 1) = 1$;

$T'[1, 3, 1] = \{j\_1\}$ $T[2, 3, 1] = \max(T[1, 3, 1], T[1, 3 - 5, 0] + 5) = 1$;

$T'[2, 3, 1] = \{j\_1\}$ $T[3, 3, 1] = \max(T[2, 3, 1], T[2, 3 - 4, 0] + 4) = 1$;

$T'[3, 3, 1] = \{j\_1\}$ $T[4, 3, 1] = \max(T[3, 3, 1], T[3, 3 - 2, 0] + 2) = 2$;

$T'[4, 3, 1] = \{j\_4\}$ $x = 1$, $w = 4$ $i = 1, \ldots, 4$:

$T[1, 4, 1] = \max(T[0, 4, 1], T[0, 4 - 1, 0] + 1) = 1$;

$T'[1, 4, 1] = \{j\_1\}$ $T[2, 4, 1] = \max(T[1, 4, 1], T[1, 4 - 5, 0] + 5) = 1$;

$T'[2, 4, 1] = \{j\_1\}$ $T[3, 4, 1] = \max(T[2, 4, 1], T[2, 4 - 4, 0] + 4) = 4$;

$T'[3, 4, 1] = \{j\_3\}$ $T[4, 4, 1] = \max(T[3, 4, 1], T[3, 4 - 2, 0] + 2) = 2$;

$T'[4, 4, 1] = \{j\_3\}$

…

$x = 2$, $w = 1$ $i = 1, \ldots, 4$:

$T[1, 1, 2] = \max(T[0, 1, 2], T[0, 1 - 1, 1] + 1) = -inf$;

$T'[1, 1, 2] = \{\}$ $T[2, 1, 2] = \max(T[1, 1, 2], T[1, 1 - 5, 1] + 5) = -inf$;

$T'[2, 1, 2] = \{\}$ $T[3, 1, 2] = \max(T[2, 1, 2], T[2, 1 - 4, 1] + 4) = -inf$;

$T'[3, 1, 2] = \{\}$ $T[4, 1, 2] = \max(T[3, 1, 2], T[3, 1 - 2, 1] + 2) = -inf$;

$T'[4, 1, 2] = \{\}$ $x = 2$ $w = 2$ $i = 1, \ldots, 4$:

$T[1, 2, 2] = \max(T[0, 2, 2], T[0, 2 - 1, 1] + 1) = -inf$;

$T'[1, 2, 2] = \{\}$ $T[2, 2, 2] = \max(T[1, 2, 2], T[1, 2 - 5, 1] + 5) = -inf$;

$T'[2, 2, 2] = \{\}$ $T[3, 2, 2] = \max(T[2, 2, 2], T[2, 2 - 4, 1] + 4) = -inf$;

$T'[3, 2, 2] = \{\}$ $T[4, 2, 2] = \max(T[3, 2, 2], T[3, 2 - 2, 1] + 2) = -inf$;

$T'[4, 2, 2] = \{\}$ $x = 2$ $w = 3$ $i = 1, \ldots, 4$:

$T[1, 3, 2] = \max(T[0, 3, 2], T[0, 3 - 1, 1] + 1) = -inf$;

$T'[1, 3, 2] = \{\}$ $T[2, 3, 2] = \max(T[1, 3, 2], T[1, 3 - 5, 1] + 5) = -inf$;

$T'[2, 3, 2] = \{\}$ $T[3, 3, 2] = \max(T[2, 3, 2], T[2, 3 - 4, 1] + 4) = -inf$;

$T'[3, 3, 2] = \{\}$ $T[4, 3, 2] = \max(T[3, 3, 2], T[3, 3 - 2, 1] + 2) = 3$;

$T'[4, 3, 2] = T'[3, 2, 1] + \{j\_4\} = \{j\_1, j\_4\}$ $x = 2$, $w = 4$ $i = 1, \ldots, 4$:

$T[1, 4, 2] = \max(T[0, 4, 2], T[0, 4 - 1, 1] + 1) = -inf$;

$T'[1, 4, 2] = \{\}$ $T[2, 4, 2] = \max(T[1, 4, 2], T[1, 4 - 5, 1] + 5) = -inf$;

$T'[2, 4, 2] = \{\}$ $T[3, 4, 2] = \max(T[2, 4, 2], T[2, 4 - 4, 1] + 4) = -inf$;

$T'[3, 4, 2] = \{\}$ $T[4, 4, 2] = \max(T[3, 4, 2], T[3, 4 - 2, 1] + 2) = 1$;

$T'[4, 4, 2] = \{j1\_, j\_4\}$

…

$x = 3$ $w = 1$ $i = 1, \ldots, 4$:

-continued $T[1, 1, 3] = \max(T[0, 1, 3], T[0, 1-1, 2] + 1) = -inf;$ $T'[1, 1, 3] = \{\}$ $T[2, 1, 3] = \max(T[1, 1, 3], T[1, 1-5, 2] + 5) = -inf;$ $T'[2, 1, 3] = \{\}$ $T[3, 1, 3] = \max(T[2, 1, 3], T[2, 1-4, 2] + 4) = -inf;$ $T'[3, 1, 3] = \{\}$ $T[4, 1, 3] = \max(T[3, 1, 3], T[3, 1-2, 2] + 2) = -inf;$ $T'[4, 1, 3] = \{\}$ $x = 3 \quad w = 2 \quad i = 1, \ldots, 4:$ $T[1, 2, 3] = \max(T[0, 2, 3], T[0, 2-1, 2] + 1) = -inf;$ $T'[1, 2, 3] = \{\}$ $T[2, 2, 3] = \max(T[1, 2, 3], T[1, 2-5, 2] + 5) = -inf;$ $T'[2, 2, 3] = \{\}$ $T[3, 2, 3] = \max(T[2, 2, 3], T[2, 2-4, 2] + 4) = -inf;$ $T'[3, 2, 3] = \{\}$ $T[4, 2, 3] = \max(T[3, 2, 3], T[3, 2-2, 2] + 2) = -inf;$ $T'[4, 2, 3] = \{\}$ $x = 3 \quad w = 3 \quad i = 1, \ldots, 4:$ $T[1, 3, 3] = \max(T[0, 3, 3], T[0, 3-1, 2] + 1) = -inf;$ $T'[1, 3, 3] = \{\}$ $T[2, 3, 3] = \max(T[1, 3, 3], T[1, 3-5, 2] + 5) = -inf;$ $T'[2, 3, 3] = \{\}$ $T[3, 3, 3] = \max(T[2, 3, 3], T[2, 3-4, 2] + 4) = -inf;$ $T'[3, 3, 3] = \{\}$ $T[4, 3, 3] = \max(T[3, 3, 3], T[3, 3-2, 2] + 2) = -inf;$ $T'[4, 3, 3] = \{\}$ $x = 3 \quad w = 4 \quad i = 1, \ldots, 4:$ $T[1, 4, 3] = \max(T[0, 4, 3], T[0, 4-1, 2] + 1) = -inf;$ $T'[1, 4, 3] = \{\}$ $T[2, 4, 3] = \max(T[1, 4, 3], T[1, 4-5, 2] + 5) = -inf;$ $T'[2, 4, 3] = \{\}$ $T[3, 4, 3] = \max(T[2, 4, 3], T[2, 4-4, 2] + 4) = -inf;$ $T'[3, 4, 3] = \{\}$ $T[4, 4, 3] = \max(T[3, 4, 3], T[3, 4-2, 2] + 2) = -inf;$ $T'[4, 4, 3] = \{\}$

...

$x = 4 \quad w = 1 \quad i = 1, \ldots, 4:$ $T[1, 1, 4] = \max(T[0, 1, 4], T[0, 1-1, 3] + 1) = -inf;$ $T'[1, 1, 4] = \{\}$ $T[2, 1, 4] = \max(T[1, 1, 4], T[1, 1-5, 3] + 5) = -inf;$ $T'[2, 1, 4] = \{\}$ $T[3, 1, 4] = \max(T[2, 1, 4], T[2, 1-4, 3] + 4) = -inf;$ $T'[3, 1, 4] = \{\}$ $T[4, 1, 4] = \max(T[3, 1, 4], T[3, 1-2, 3] + 2) = -inf;$ $T'[4, 1, 4] = \{\}$ $x = 4 \quad w = 2 \quad i = 1, \ldots, 4:$ $T[1, 2, 4] = \max(T[0, 2, 4], T[0, 2-1, 3] + 1) = -inf;$ $T'[1, 2, 4] = \{\}$ $T[2, 2, 4] = \max(T[1, 2, 4], T[1, 2-5, 3] + 5) = -inf;$ $T'[2, 2, 4] = \{\}$ $T[3, 2, 4] = \max(T[2, 2, 4], T[2, 2-4, 3] + 4) = -inf;$ $T'[3, 2, 4] = \{\}$ $T[4, 2, 4] = \max(T[3, 2, 4], T[3, 2-2, 3] + 2) = -inf;$ $T'[4, 2, 4] = \{\}$ $x = 4 \quad w = 3 \quad i = 1, \ldots, 4:$ $T[1, 3, 4] = \max(T[0, 3, 4], T[0, 3-1, 3] + 1) = -inf;$ $T'[1, 3, 4] = \{\}$ $T[2, 3, 4] = \max(T[1, 3, 4], T[1, 3-5, 3] + 5) = -inf;$ $T'[2, 3, 4] = \{\}$ $T[3, 3, 4] = \max(T[2, 3, 4], T[2, 3-4, 3] + 4) = -inf;$ $T'[3, 3, 4] = \{\}$ $T[4, 3, 4] = \max(T[3, 3, 4], T[3, 3-2, 3] + 2) = -inf;$ $T'[4, 3, 4] = \{\}$ $x = 4 \quad w = 4 \quad i = 1, \ldots, 4:$ $T[1, 4, 4] = \max(T[0, 4, 4], T[0, 4-1, 3] + 1) = -inf;$ $T'[1, 4, 4] = \{\}$ $T[2, 4, 4] = \max(T[1, 4, 4], T[1, 4-5, 3] + 5) = -inf;$ $T'[2, 4, 4] = \{\}$ $T[3, 4, 4] = \max(T[2, 4, 4], T[2, 4-4, 3] + 4) = -inf;$ $T'[3, 4, 4] = \{\}$ $T[4, 4, 4] = \max(T[3, 4, 4], T[3, 4-2, 3] + 2) = -inf;$ $T'[4, 4, 4] = \{\}$ At the end of the above procedure, the single subset of jobs, that maximizes memory utilization, has to be selected from 4 final sets for i=4, w=4 and x=1 . . . 4. In our example scheduler selects T'[4,4,1]={j_3} since max(T[4,4,1]=4, T[4,4,2]=3, T[4,4,3]=−inf, T[4,4,4]=−inf)=T[4,4,1].

The next example shows that presented scheduling protocol improves system performance significantly. Let us assume that total available memory is 5 blocks. There are m thin jobs and m fat jobs waiting in the queue. Each thin job consumes 2 blocks of memory and each fat job consumes 3 blocks of memory. Additionally, let us assume that k=1=2 and each job can be executed with one unit of time.

The conventional scheduling, that does not maximize memory utilization, could start from scheduling thin jobs. Since total available memory is 5 blocks all thin jobs would be executed in pairs (each pair consumes 2+2=4 blocks). That is, all thin jobs may be executed after m/2 units of time. Next, the fat jobs would be scheduled.

Due to memory limitations scheduler may only schedule one fat job in a procedure. That is, fat jobs may be executed after m units of time. Thus, all jobs may be completed after m+m/2 units of time.

However with the present scheduling method only m units of time may be needed to complete all the jobs. Scheduling protocol will combine one thin and one fat job. Thus, the system throughput is improved by 30%.

FIG. 3 shows a typical example of scheduled jobs using the present method. A number of jobs 360, which are scheduled using the present method, are running in the computer system. Each job uses one of the renewable resources. For example, job 360.1 uses a network 307, job 360.2 uses a first CPU 303.1, job 360.3 uses a second CPU 303.2, job 360.4 uses a hard disk 307. Running jobs consume most of the memory 309 of the computing system. For example, if there is no available memory, the 2 jobs 350 may wait in the queue 301 until to be scheduled using the present method.

What is claimed is:

1. A computer implemented method for scheduling a single subset of jobs of a set of jobs satisfying a range constraint of number of jobs, wherein the jobs of the set of jobs share resources in a computing system, each job being assigned a weight, w, indicative of the memory usage of the job in case of its execution in the computer system, the method comprising:
repeating, for each number of jobs, x, in the range:
determining from the set of jobs a first subset of jobs using a knapsack problem, wherein the knapsack problem is adapted to select by using the weights of the first subset of jobs, having the number of jobs and having a maximal total memory usage below the current available memory of the computer system,
selecting the single subset from the first subset of jobs, the selecting comprising:
providing a first memory threshold value and a second memory threshold value;
selecting from the first subset a second set of subsets, wherein each subset of the second set has the total memory usage higher than the first memory threshold value and lower than the second memory threshold value;
partitioning the jobs of each subset of the second set into job categories; and
selecting the single subset from the second set of subsets as the subset of jobs satisfying an operating condition of the computer system, wherein the operating condition comprises a maximum number of jobs belonging to a same job category, and
scheduling the single subset of jobs to execute on a processor in the computer system.

2. The method of claim 1, wherein the determining comprises:
for each number of jobs, x, satisfying the range constraint, solving the knapsack problem using a method selected from the group consisting of mathematical programming, dynamic programming, and greedy algorithms.

3. The method of claim 1, wherein each job is associated with a user ID, wherein the operating condition comprises: a maximum number of jobs having a same user ID.

4. The method of claim 2, wherein the solving using dynamic programing comprises:
recursively determining a solution $T[i, w, x]$ to the adapted knapsack problem for a value of x,
wherein $T[i, W, x]=\max(T[i-1,W,x], T[i-1,W-w\_i, x-1]+w\_i)$, where W is the current available memory of the computer system, i is the first i jobs of the set of jobs, and w_i is the weight of $i^{th}$ job.

5. The method of claim 4, wherein selecting the single subset comprises:
comparing the solution $T[i, W, x]$ for each number of jobs x;
determining the single subset as a subset having a solution $T[i,W,x]$ defining a number of jobs x with the maximal total usage of memory.

6. The method of claim 1, further comprising:
providing a predefined lower limit k and a predefined upper limit l of jobs,
comparing the lower limit k with the number of running jobs r in the computer system, and
determining the range constraint as the interval [k-r, l-r], in case r is below k.

7. The method of claim 1, wherein the computing system comprises a database system, wherein each job is a SQL query job.

8. A computer system for scheduling a single subset of jobs of a set jobs satisfying a range constraint of number of jobs, wherein the jobs of the set of jobs share resources in the computer system, each job being assigned a weight, w, indicative of the memory usage of the job in case of its execution in the computer system, the computer system comprising:
a memory having computer readable instructions; and
a processor for executing the computer readable instructions, the computer readable instructions including:
repeating, for each number of jobs, x, in the range:
determining from the set of jobs a first subset of jobs using a knapsack problem, wherein the knapsack problem is adapted to select by using the weights of the first subset of jobs, having the number of jobs and having a maximal total memory usage below the current available memory of the computer system,
selecting the single subset from the first subset obtained by the determining unit, the selecting comprising:
providing a first memory threshold value and a second memory threshold value;
selecting from the first subset a second set of subsets, wherein each subset of the second set has the total memory usage higher than the first memory threshold value and lower than the second memory threshold value;
partitioning the jobs of each subset of the second set into job categories; and
selecting the single subset from the second set of subsets as the subset of jobs satisfying an operating condition of the computer system, wherein the operating condition comprises a maximum number of jobs belonging to a same job category, and
scheduling the single subset of jobs to execute on a processor in the computer system.

9. A computer program product for scheduling a single subset of jobs of a set of jobs satisfying a range constraint of number of jobs, wherein the jobs of the set of jobs share resources in a computing system, each job being assigned a weight, w, indicative of the memory usage of the job in case of its execution in the computer system, the computer program product comprising a non-transitory computer readable storage medium having program code embodied therewith, the program code for implementing a method comprising:
repeating, for each number of jobs, x, in the range:
determining from the set of jobs a first subset of jobs using a knapsack problem, wherein the knapsack problem is adapted to select by using the weights of the first subset of jobs, having the number of jobs and having a maximal total memory usage below the current available memory of the computer system, selecting the single subset from the first subset of jobs, the selecting comprising:
provided a first memory threshold value and a second memory threshold value;
selecting from the first subset a second set of subsets, wherein each subset of the second set has the total memory usage higher than the first memory threshold value and lower than the second memory threshold value;
partitioning the jobs of each subset of the second set into job categories; and
selecting the single subset from the second set of subsets as the subset of jobs satisfying an operating condition of the computer system, wherein the operating condition comprises a maximum number of jobs belonging to a same job category, and scheduling the single subset of jobs to execute on a processor in the computer system.

10. The computer program product of claim 9, wherein the determining comprises:
for each number of jobs, x, satisfying the range constraint, solving the knapsack problem using a method selected from the group consisting of mathematical programming, dynamic programming, and greedy algorithms.

11. The computer program product of claim 9, wherein each job is associated with a user ID, wherein the operating condition comprises: a maximum number of jobs having a same user ID.

12. The computer program product of claim 10, wherein the solving using dynamic programing comprises:
recursively determining a solution $T[i, w, x]$ to the adapted knapsack problem for a value of x,
wherein $T[i, W, x]=\max(T[i-1,W,x], T[i-1, W-w\_i, x-1]+w\_i)$, where W is the current available memory of the computer system, i is the first i jobs of the set of jobs, and $w\_i$ is the weight of $i^{th}$ job.

13. The computer program product of claim 12, wherein selecting the single subset comprises:
comparing the solution $T[i, W, x]$ for each number of jobs x;
determining the single subset as a subset having a solution $T[i,W,x]$ defining a number of jobs x with the maximal total usage of memory.

14. The computer program product of claim 9, further comprising:
providing a predefined lower limit k and a predefined upper limit l of jobs,
comparing the lower limit k with the number of running jobs r in the computer system, and
determining the range constraint as the interval [k-r, l-r], in case r is below k.

15. The computer program product of claim 9, wherein the computing system comprises a database system, wherein each job is a SQL query job.

* * * * *